United States Patent [19]
Joshi et al.

[11] Patent Number: 5,812,847
[45] Date of Patent: Sep. 22, 1998

[54] RULE-BASED METHOD FOR DESIGNING USER INTERFACES FOR APPLICATIONS

[75] Inventors: Rajiv Vasant Joshi; Suchitra Rajiv Joshi, both of Yorktown Heights, N.Y.

[73] Assignee: International Business Machines Corporation, Armonk, N.Y.

[21] Appl. No.: 595,721

[22] Filed: Feb. 2, 1996

[51] Int. Cl.$^6$ .................................................. G06F 9/40
[52] U.S. Cl. ........................... 395/682; 707/104; 345/333
[58] Field of Search ................................ 395/682, 701, 395/702; 707/104; 345/333

[56] References Cited

U.S. PATENT DOCUMENTS

| | | | |
|---|---|---|---|
| 5,325,533 | 6/1994 | McInerney et al. | 395/701 |
| 5,353,401 | 10/1994 | Iizawa et al. | 395/161 |
| 5,761,656 | 6/1995 | Ben-Shachar | 707/4 |

OTHER PUBLICATIONS

Price, Josh, "Symantec Enterprise Developer 1.1.," DBMS, v8, n1, p. 26(3), Jan. 1995.

Blaszczak, Mike, "Implementing OLE control containers with MFC and the OLE Control Developer's Kit," Microsoft Systems Journal, v10, n4, pp. 37(17), Apr. 1995.

Coffee, Peter, "Working RAD magic (Magic Software Magic 7.0)," PC Week, v13, n31, p, 65(2) [Not Prior Art], Aug. 1996.

Brockschmidt, Kraig, "A primer on designing custom controls," Microsoft Systems Journal, v7, n2, p. 87(14), Mar. 1992.

Pantziarka, Pan, "Muscling in to Client/Server", EXE, p. (7), Aug. 1994.

*Primary Examiner*—Alvin Oberley
*Assistant Examiner*—St. John Courtenay, III
*Attorney, Agent, or Firm*—Whitham, Curtis & Whitham; Robert P. Tassinari

[57] ABSTRACT

A computer-implemented method for a system having a database and a plurality of application software interfaces, the method including steps of reading a control type from a plurality of control types stored in the database, selecting an application software interface having a pointer based on the control type, defining an identification code for the control type, storing the pointer and the identification code and linking a first node to a second, subsequent node of control types and creating a linked list of the plurality of control types.

15 Claims, 12 Drawing Sheets

| 21 | 22 | 23 | 24 | 25 | 26 |
|---|---|---|---|---|---|
| CONTROL TYPE | COORDINATES | UNIQUE ID | PARENT | OWNER | MISC. INFO |
| CHECK BOX | 1,22,30,10 | 529 | WINDOW 1 (FIGURE 5A) | WINDOW 1 | TITLE OF CB |
| PUSH BUTTON | 1,28,35,10 | 530 | WINDOW 1 (FIGURE 5A) | WINDOW 1 | TITLE OF PB |
| RADIO BUTTON | 1,30,35,10 | 531 | WINDOW 2 (FIGURE 5B) | WINDOW 2 | REFER TABLE 2 |
| ENTRY FIELD | 1,24,40,15 | 532 | WINDOW 3 (FIGURE 5C) | WINDOW 3 | TITLE OF EF |
| LIST BOX | 1,45,40,40 | 533 | WINDOW 3 (FIGURE 5C) | WINDOW 3 | REFER TABLE 2 |

| 21 | 22 | 23 | 24 | 25 | 26 |
|---|---|---|---|---|---|
| CONTROL TYPE | COORDINATES | UNIQUE ID | PARENT | OWNER | MISC. INFO |
| PUSH BUTTON | 1,28,15,10 | 560 | WINDOW 4 (FIGURE 7) | WINDOW 4 | TEST 1 |
| PUSH BUTTON | 20,28,15,10 | 561 | WINDOW 4 (FIGURE 7) | WINDOW 4 | TEST 2 |
| PUSH BUTTON | 41,28,15,10 | 562 | WINDOW 4 (FIGURE 7) | WINDOW 4 | TEST 3 |
| ENTRY FIELD | 10,40,20,15 | 563 | WINDOW 4 (FIGURE 7) | WINDOW 4 | TEST 4 |

| CONTROL TYPE | COORDINATES | UNIQUE ID | PARENT | OWNER | MISC. INFO |
|---|---|---|---|---|---|
| CHECK BOX | 1,22,30,10 | 529 | WINDOW 1 (FIGURE 5A) | WINDOW 1 | TITLE OF CB |
| PUSH BUTTON | 1,28,35,10 | 530 | WINDOW 1 (FIGURE 5A) | WINDOW 1 | TITLE OF PB |
| RADIO BUTTON | 1,30,35,10 | 531 | WINDOW 2 (FIGURE 5B) | WINDOW 2 | REFER TABLE 2 |
| ENTRY FIELD | 1,24,40,15 | 532 | WINDOW 3 (FIGURE 5C) | WINDOW 3 | TITLE OF EF |
| LIST BOX | 1,45,40,40 | 533 | WINDOW 3 (FIGURE 5C) | WINDOW 3 | REFER TABLE 2 |

FIG.2A

| CONTROL TYPE | COORDINATES | UNIQUE ID | PARENT | OWNER | MISC. INFO |
|---|---|---|---|---|---|
| PUSH BUTTON | 1,28,15,10 | 560 | WINDOW 4 (FIGURE 7) | WINDOW 4 | TEST 1 |
| PUSH BUTTON | 20,28,15,10 | 561 | WINDOW 4 (FIGURE 7) | WINDOW 4 | TEST 2 |
| PUSH BUTTON | 41,28,15,10 | 562 | WINDOW 4 (FIGURE 7) | WINDOW 4 | TEST 3 |
| ENTRY FIELD | 10,40,20,15 | 563 | WINDOW 4 (FIGURE 7) | WINDOW 4 | TEST 4 |

FIG.2B

| CONTROL ID | DATA |
|---|---|
| 533 | DATA ITEM 1 FOR LIST BOX 533 |
| 533 | DATA ITEM 2 FOR LIST BOX 533 |
| 533 | DATA ITEM 3 FOR LIST BOX 533 |
| 533 | DATA ITEM 4 FOR LIST BOX 533 |
| 531 | VALUE 1 |
| 531 | VALUE 2 |
| 531 | VALUE 3 |
| 531 | VALUE 4 |

FIG.3

Some examples of:
Entry Fields:
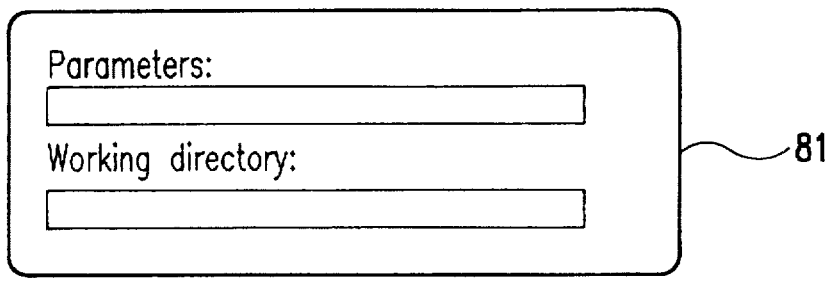
List Boxes:
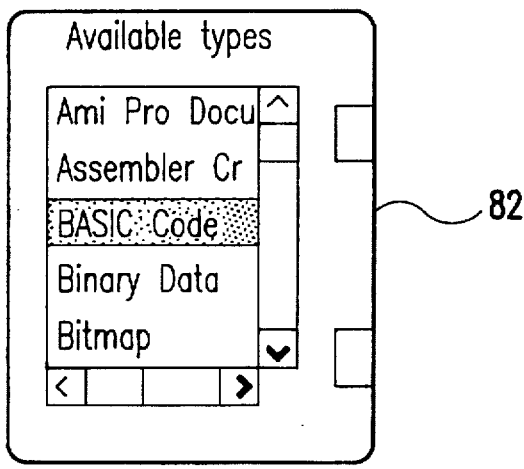
Radio Buttons:
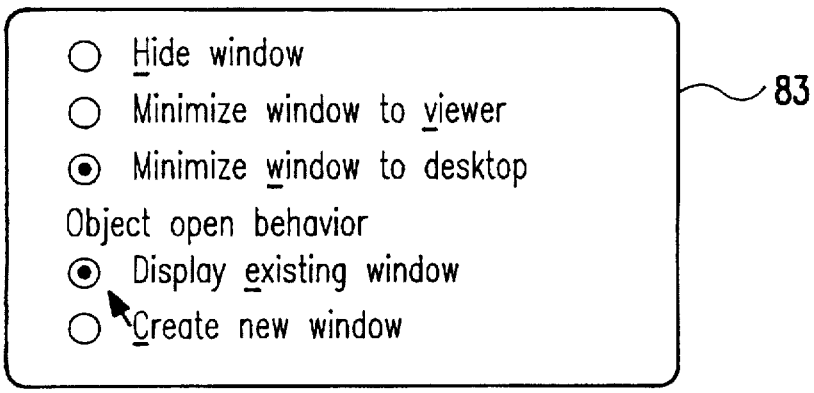
FIG.8A Push Buttons:

RULE-BASED METHOD FOR DESIGNING USER INTERFACES FOR APPLICATIONS

BACKGROUND OF THE INVENTION

The present invention generally relates to designing and maintaining user interfaces, and more specifically to a method for designing graphic user interfaces (GUI) based on rules.

Description of the Related Art

Current computer languages provide Application Program Interfaces (APIs), to generate "child windows" or sub-windows for controls such as Entry Fields, List Boxes, Radio Buttons and Push Buttons.

For purposes of this application, a "child window" is defined as a window that is dependent on main or parent windows to receive all mouse and keyboard inputs. Every application creates at least one window. Each window plays some part in displaying outputs and/or receiving inputs from the user.

An application window can use several types of subordinate windows like frame windows, client windows, control windows, dialog windows, message boxes, menu, etc. This invention involves programming control windows like entry fields, list boxes, radio buttons and push buttons. Control windows can also be referred to as child windows. For purposes of this application a child window or control window is defined as a window that is dependent on main or parent windows to receive all mouse and keyboard inputs. Selecting a control window will indicate if a selection is made or initiate certain action when actuated or clicked on by the user (e.g., clicked on either by mouse or pressing "enter" key on the keyboard).

Entry fields are defined as a control field into which a user places text. The limit on the total number of characters in the field can be preset.

List boxes are defined as a control that contains a list of objects or settings choices that a user can select. List boxes are windows displaying the choices that users can scroll up or down.

Radio buttons are defined as controls combined to show a user a fixed set of choices from which the user can select one. Radio buttons are depicted as a circle with text beside it. The circle is partially filled or darkened when chosen or clicked on by a mouse pointer.

Push buttons are controls appearing as a button, filled with text or graphics that will initiate certain action when the user selects it by pressing the "enter" key on the keyboard, or by single clicking the mouse pointer on it.

FIGS. 8A and 8B illustrate common examples of entry fields 81, list boxes 82, radio buttons 83 and push buttons 84.

Designing and programming such user interfaces in a time efficient manner and at a minimum cost is an important consideration in the preparation of APIs.

In the conventional systems and methods, the Application Program (AP) code must be modified in order to change window layouts and/or configurations of the controls within the application window. Moreover, the coordinates and layouts of the controls are generally "hard coded" within the AP. For purposes of this application, "hard coded" means that a window size and position are explicitly specified in the program code.

Therefore, a problem arises when a change in the window layout is desired in that the AP must be recompiled, reloaded and run in order to determine the effects of the changes made to the controls or fields. This is computationally very time-consuming and very inefficient.

Further, in the conventional systems and methods, one AP controls one window and its layout at any given time. Such dedicated control occurs because it is simpler to code and maintain. However, such dedicated control adds to the development and maintenance costs of the software.

Other problems of the conventional systems and methods include that the lines of code increase as the number of windows increases in a specific application. Adding new code to enhance the application is also a major undertaking in the conventional systems.

SUMMARY OF THE INVENTION

It is, therefore, an object of the present invention to overcome the above problems of the conventional systems and methods, and more specifically to provide a method for designing graphic user interfaces which are rule-based.

According to the present invention, an innovative universal methodology is provided which invokes the layouts of the fields, pertinent to an application window, to thereby overcome the above problems of the conventional systems and methods.

In a first aspect of the invention, a computer-implemented method for a system having a database and a plurality of application software interfaces is provided. The method includes steps of reading a control type from a plurality of control types stored in the database, and selecting an application software (program) interface having a pointer based on the control type. Thereafter, an identification code is defined for the control type, and the pointer and the identification code are stored. Finally, a first node is linked to a second, subsequent node of control types and a linked list of the plurality of control types is created.

The methodology employed in the present invention not only maintains the simplicity and maintainability of the code but also lowers production costs. Specifically, the invention makes it easier to build newer applications as repetitious code is consolidated by the inventive method.

With the present invention, an application developer can design a GUI by eliminating the recompilation and reloading time by an order of magnitude. The application code to generate child windows can be simply written once and can be reused for other application, thus saving on development and maintenance. The invention allows the predefined controls to be extremely flexible and changeable, without affecting the application code.

Thus, with the present invention, the Application Program code need not be modified in order to change window coordinates and/or configurations of the controls within the application window. Moreover, the coordinates and layouts of the controls need not be "hard coded" within the AP. Hence, when a change in the window layout is desired, the AP does not have to be recompiled, reloaded and run in order to determine the effects of the changes made to the controls or fields. As a result, a quick computation can be made and the system has increased efficiency. Another advantage is that the structure and method of the invention does not require that one Application Program control a respective one window and its layout at any given time, as in the conventional methods. Thus, development and maintenance costs of the software are reduced, as compared to the conventional systems and methods.

Other advantages of the present invention include reuse of code for other applications, lowering of maintenance costs and maintaining the simplicity of code. The present invention can be implemented on any graphic user interface-based operating system.

BRIEF DESCRIPTION OF THE DRAWINGS

The foregoing and other objects, aspects and advantages will be better understood from the following detailed description of a preferred embodiment of the invention with reference to the drawings, in which:

FIGS 2A and 2B illustrate tables in which rules for the user interfaces are defined according to a preferred embodiment of the present invention.

FIG. 3 is a block diagram illustrating data for a List Box and a Radio Button according to the preferred embodiment of the present invention.

FIGS. 8A and 8B Illustrate Entry Fields, List Boxes, Radio Buttons and Push Buttons.

DETAILED DESCRIPTION OF A PREFERRED EMBODIMENT OF THE INVENTION

Figure 1:
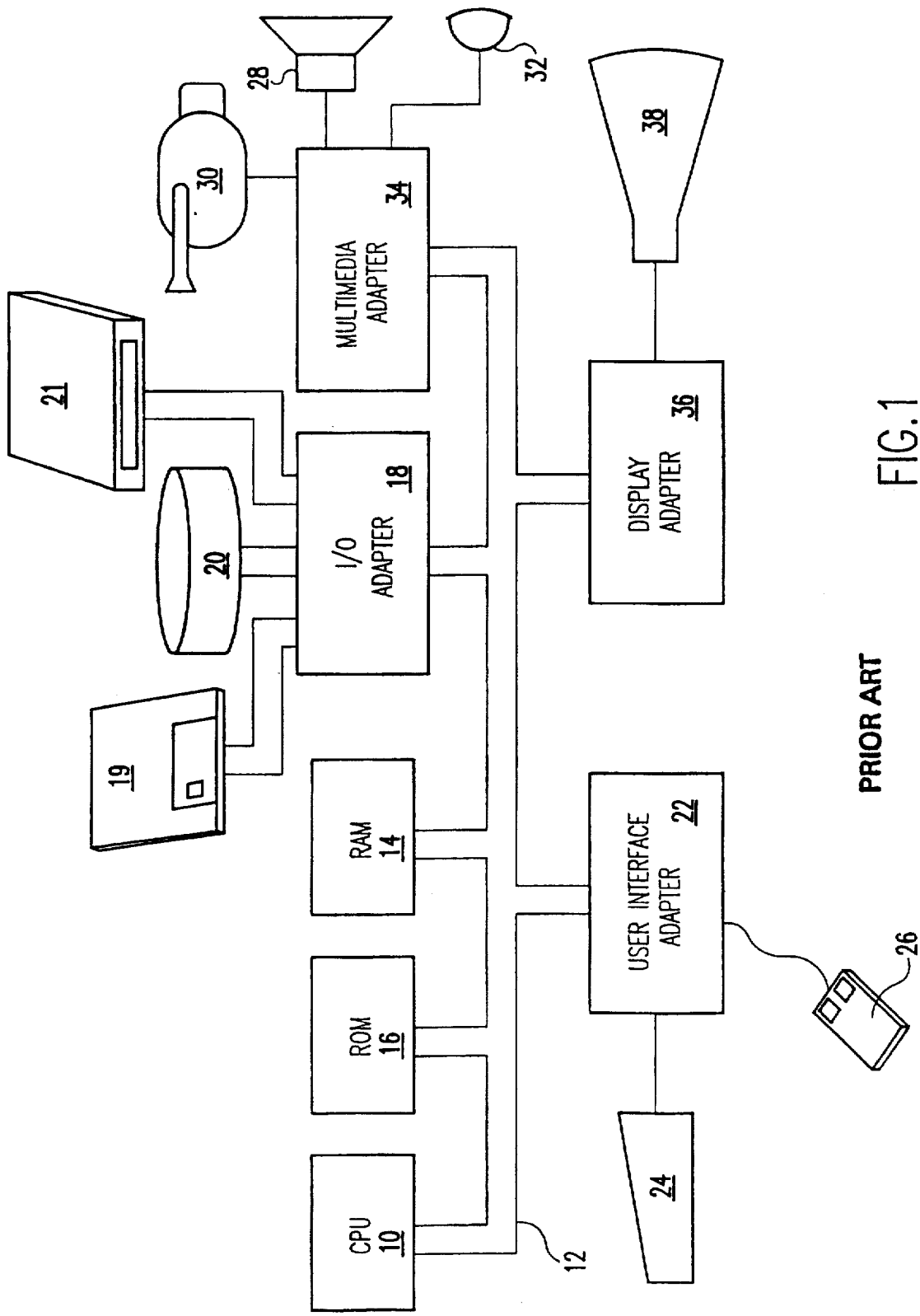
FIG. 1 is a block diagram showing a hardware configuration on which the subject invention may be implemented.

Referring now to the drawings, and more particularly to FIG. 1, there is shown for the present invention an exemplary hardware environment which may include a personal computer, such as the International Business Machines (IBM) Corporation's Personal System/2 (PS/2) family of Personal Computers.

The hardware includes a central processing unit (CPU) 10, which may conform to Intel's X86 architecture or may be a reduced instruction set computer (RISC) microprocessor such as IBM's PowerPC microprocessor.

The CPU 10 is attached to a system bus 12 to which are attached a read/write or random access memory (RAM) 14, a read-only memory (ROM) 16, an input/output (I/O) adapter 18, and a user interface adapter 22. The RAM 14 provides temporary storage for application program code and data, while ROM 16 typically includes the basic input/output system (BIOS) code.

The I/O adapter 18 is connected to one or more Direct Access Storage Devices (DASDs), such as for example a floppy drive 19, a hard disk drive 20 and a CD-ROM 21. The hard disk drive 20 typically stores the computer's operating system (OS), such as IBM's OS/2 operating system, and various application programs, each of which are selectively loaded into RAM 14 via the system bus 12. The user interface adapter 22 has attached to it a keyboard 24, a mouse 26, and/or other user interface devices (not illustrated).

The personal computer or workstation also includes a display 38, which may be, for example, a cathode ray tube (CRT) display but which also may be a liquid crystal display (LCD) or other suitable display. The display 38 is connected to the system bus 12 via a display adapter 36. A multimedia adapter 34, such as Intel Corporation's Action Media II Display Adapter, is connected to the bus 12 and to a microphone 32, a speaker 28 and a video camera 30 for audio/video capture and playback. The multimedia adapter 34 is supported by suitable software, such as IBM's Multimedia Presentation Manager/2. The inventive approach has been implemented in Smalltalk/OS2 as part of the Isis Authoring Environment.

As will be understood by those skilled in the art, other hardware and software also may be incorporated into the system depending upon the designer's requirements and constraints.

Briefly and as mentioned above, the invention provides a methodology in which user interfaces can be suitably altered at any time throughout the life of the application, without any changes to the application code actually occurring or being required, thereby reducing compilation time and reducing the risk of introducing "bugs" (e.g., defects) into the application. The same code also may be used to arrange the layout of controls in other parent windows, thereby saving substantially on software development and maintenance costs. Indeed, the application code to generate "child window" is written only once and can be reused for other applications.

Generally, all user interface applications contain controls such as, for example, Entry Fields, List Boxes, Check Boxes, Radio Buttons, which are described in detail above. Other controls are also envisioned as required by the designer.

The operating system, such as Presentation Manager in OS/2 or the like which may be used with the present invention, provides APIs to define and interact with these controls. An application creates a window by using any operating system graphics manager provided API (e.g., in Presentation Manager at OS/2 WinCreate Window is the API).

The minimum required information for these APIs is window name, parent window, window position relative to the parent window, window width and height, window style, window identifier and some window specific information.

Window name is a text string that identifies the window and its purpose for the user.

Parent window provides the coordinate system used for positioning the window and defines the relationship the child window has with other sibling windows. The parent window also alters the appearance and behavior of child window (e.g., in Presentation Manager on OS/2 if a parent window is hidden, the child window is also hidden).

Regarding window position, every window has a position and size. The position is specific to the location of the window on the screen of the window's lower left corner. This position is relative to the lower left corner of the parent window (in pixels).

Regarding window width & height, a windows size is the width and height of a window (x axis, y axis in pixels).

Every window can have a style which defines how a window looks or behaves. Some styles are specific to certain types of windows.

A window identifier uniquely identifies a window with a given application. This identifier will identify a sender of messages.

When a window is created, the API returns a window handle. The handle is a unique value for every window that is created. The handle is used to send a message to a given window or direct it to execute some action.

The window's size and position are coordinates expressing the boundaries of the drawn window on the screen. The default coordinate system specifies that the point (0,0) (X axis, Y axis) is at the window lower left corner. Coordinates generally increase upwards and to the right.

These coordinates can be specified when a window is created or can be changed at any time.

According to the inventive method, for all controls that will appear within a parent window, a database containing rules is defined in a tabular format, such as the tables illustrated in FIGS. 2A and 2B.

The exemplary tables of FIGS. 2A and 2B illustrate six columns which respectively contain the Control Type 21, Coordinates 22, Unique ID 23, Parent 24, Owner 25 and Miscellaneous Information 26. The Table may have any number of columns depending on the designer's requirements and the Tables of FIG. 2A and 2B are merely exemplary.

Specifically, the Control Type column 21 includes information regarding the type of control to be drawn in the given window on the display screen. For example, the control types (e.g., "child windows") may include a Check Box, Push Button, Radio Button, Entry Field or a List Box, as discussed above. Other types of windows also are possible such as main windows for an application program, message boxes, static control that displays text or icon data, check box, three state button and others.

Figure 5A:
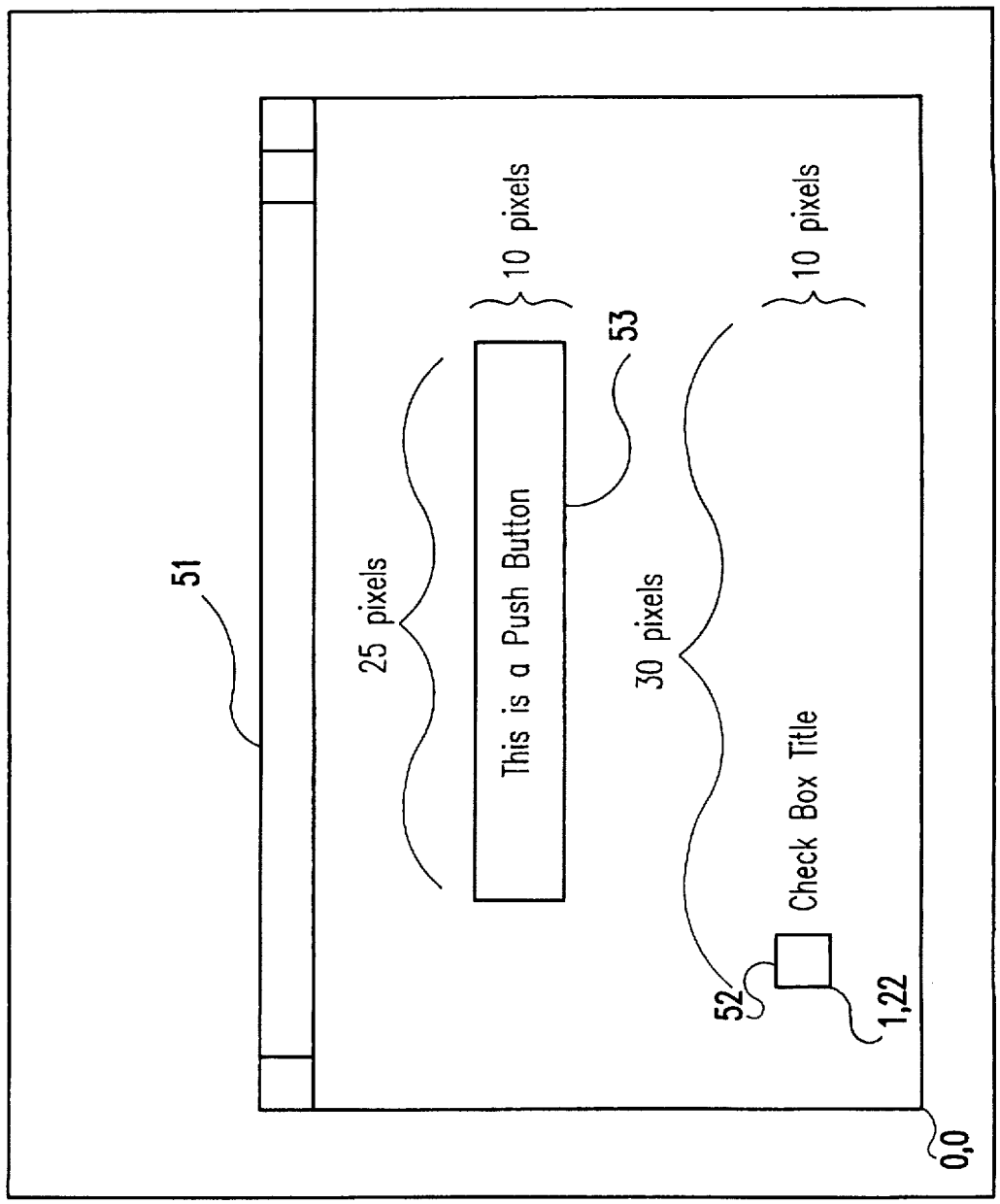
FIGS. 5A–5C illustrate various control items within display screens according to the present invention.

The Coordinates column 22 identifies the position on the display screen of the control. For example, the position of the Check Box would be 1, 22, 30, 10 according to the Table shown in FIG. 1. This means that the Check Box will be positioned at the following coordinates x=1 pixel, y=22 pixels and have a length of 30 pixels and a height of 90 pixels. All units are measured in pixels of the display screen. FIG. 5A illustrates the appearance of Check Box 52 within a parent window 51 according to the parameters set forth in the table illustrated in FIG. 2A.

Figure 5B:
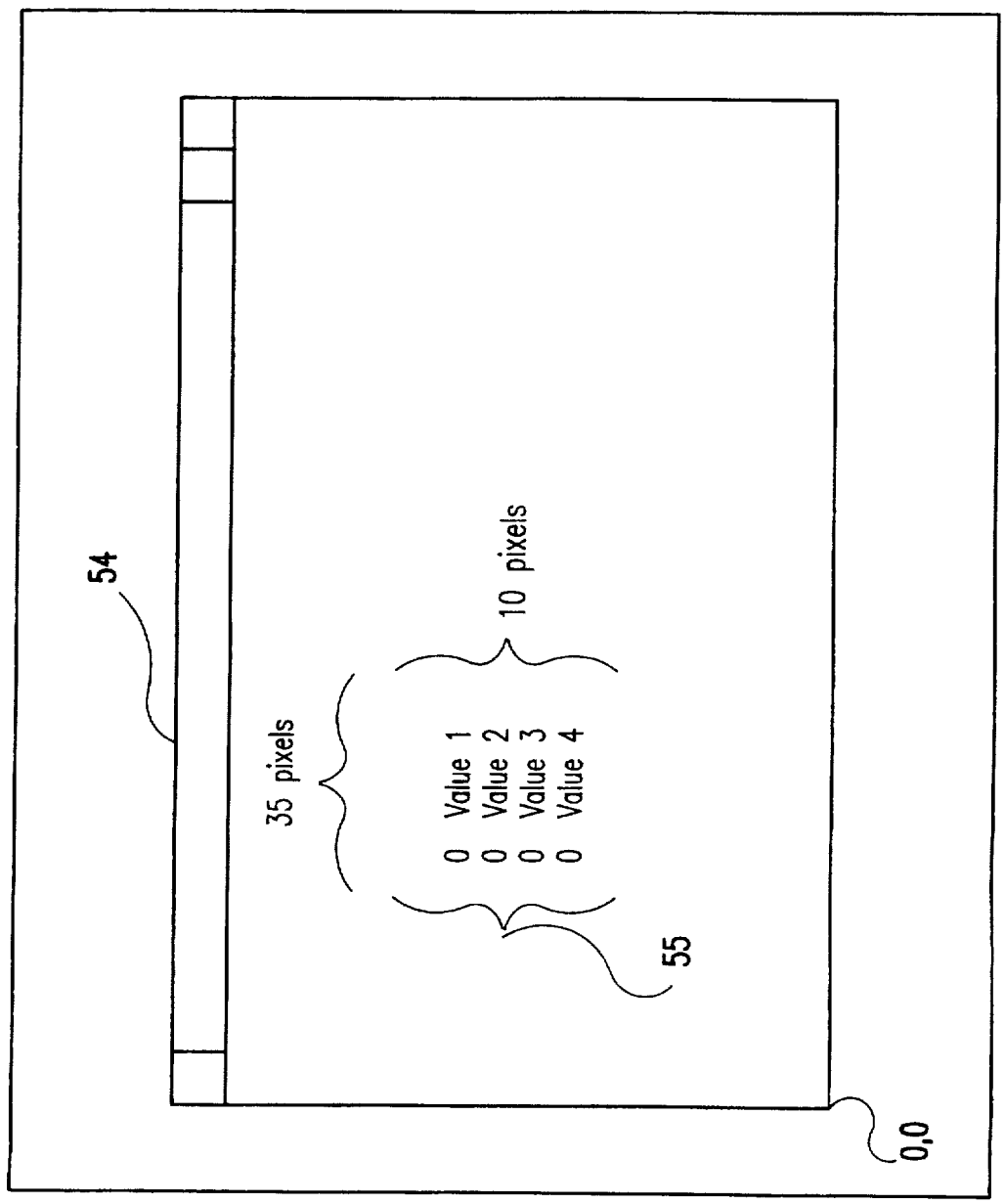
Figure 5C:
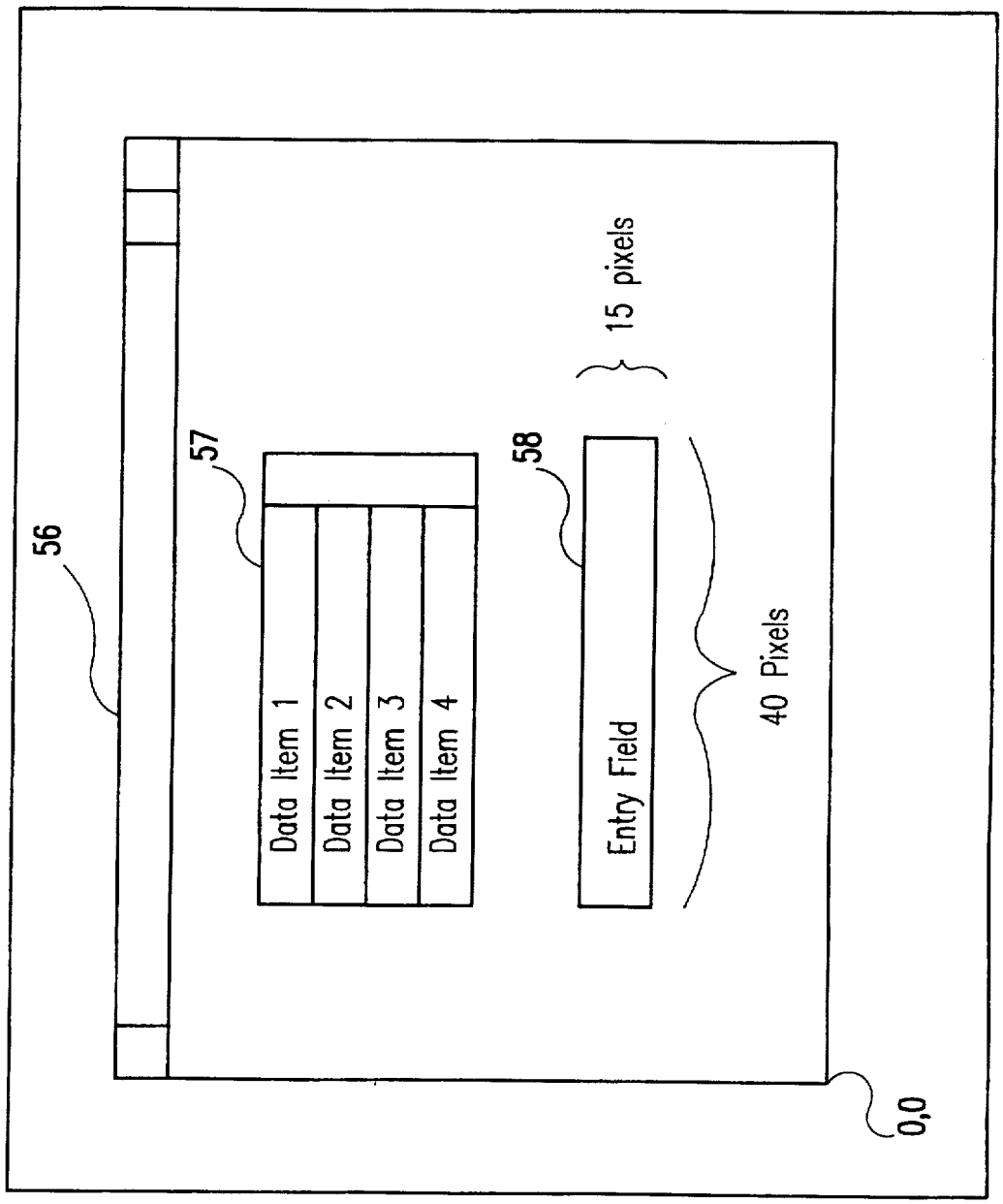

Similarly, FIG. 5A illustrates the appearance of the Push Button according to the parameters set forth in FIG. 2A. FIGS. 5B similarly illustrates the appearance of Radio Buttons. FIG. 5C illustrates the appearance of an Entry Field and a List Box according to FIG. 2A.

Figure 7:
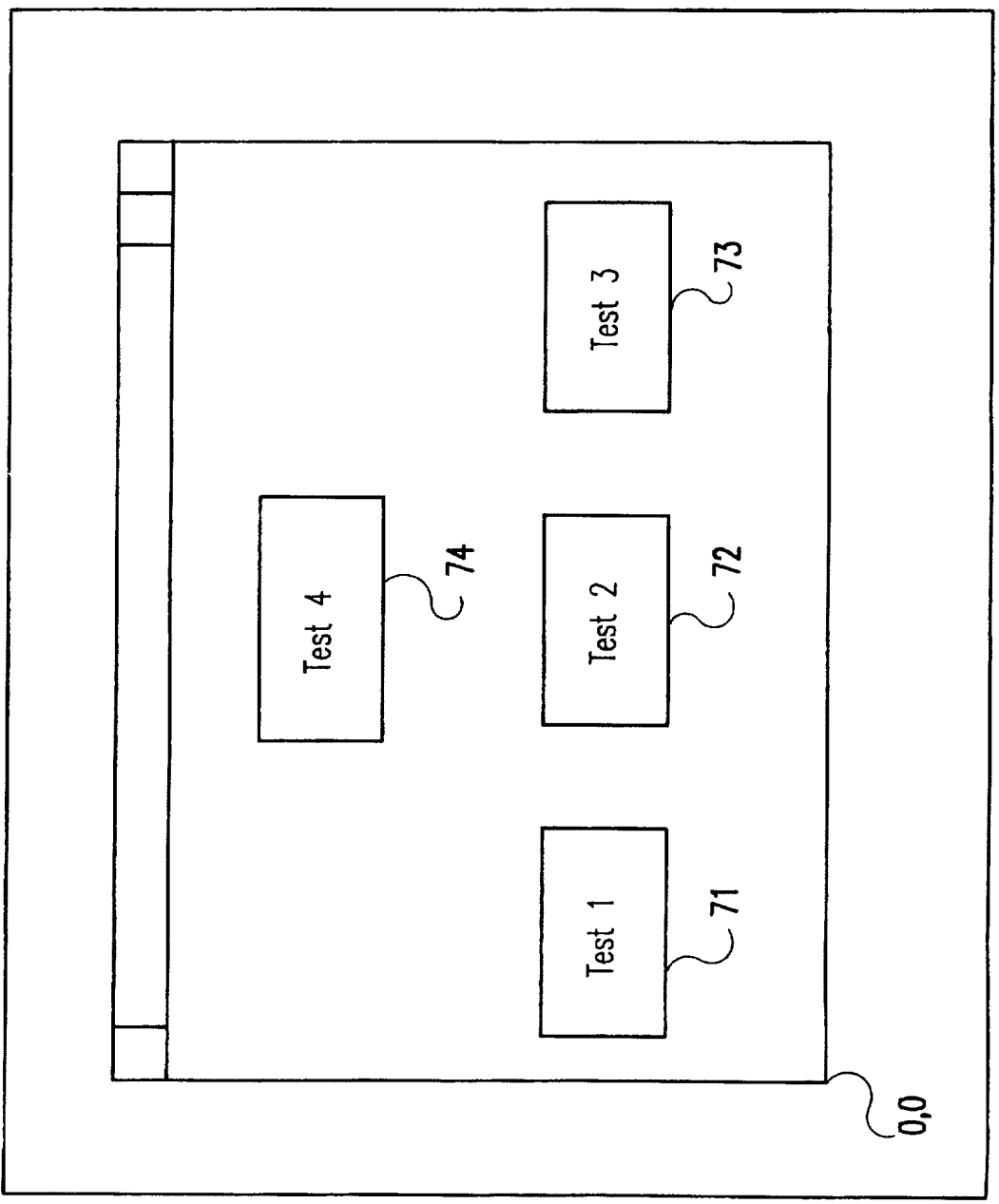
FIG. 7 illustrates a display screen according to the present invention.
Figure 8B:
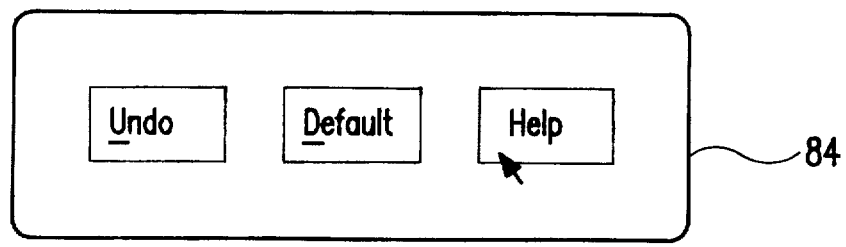

FIG. 2B relates to the push buttons illustrated in FIG. 7. Specifically, the push button with unique ID 560 is push button 71. The push button with unique ID 561 is push button 72. The push button with unique ID 562 is push button 73. The entry field with unique ID 563 is test button 74.

Referring to FIG. 5A, the position of the control (a check box 52) is relative to a lower left corner (0,0) of the parent window 51. The check box 52 will be drawn in window 51 after window 51 is displayed. The size of the check box 52 is, for example, 30 pixels long by 10 pixels high. If the position and size coordinates are not specified, Presentation Manager in OS/2 or other API will assign default values.

The coordinates column 22 also defines the position of the other control types, including the position of the Push Button, Radio Button, Entry Field and List Box.

The Unique ID column 23 contains an identification code for each of the control types. For example, the identification code of the Check Box would be 529 which identifies the window. A window identifier makes each window unique in conjunction with other windows. This identifier lets the window identify itself when it sends information to the owner window. This identifier is required when defining any new window or display.

The Unique ID column 23 also defines an identification code for each of the other control types listed in the Control Type column 21.

The Parent column 24 identifies which window is the parent of a given control type. A window is designated a "parent" of a control type when the control window will be drawn within its boundaries/coordinates. Every window created needs a parent window in Presentation Manager under OS/2. Other graphical managers also require identifiers.

For example, referring to FIG. 5A window 51 would be the parent of the Check Box 52 and the Push Button 53. Referring to FIG. 5B, window 54 would be the parent of the Radio Button 55. Referring to FIG. 5B, window 56 would be the parent of the Entry Field 58 and the parent of the List Box 57.

These relationships are designated by the application programmer/designer in advance. The designer will define these requirements as rules in the table (FIGS. 2A and 2B). According to the present invention, if the programmer/designer wants to change the relationships, only the rules need be changed. The code or program does not need to be modified.

Similarly, the Owner column 25 identifies which window is the owner of a given control type. For example, window 1 would be the owner of the Check Box and the Push Button, window 2 would be the owner of the Radio Button, window 3 would be the owner of the Entry Field and window 4 would be the owner of the List Box.

The significance of a window being the "owner" of a control type is that an owner window coordinates the activities of a window in reference to other windows that are also displayed. For example, in Program Manager, the window sends messages about its state to its owner window and the owner sends messages about what action to carry out next. An owner is similar to a parent but does not affect the behavior or appearance of the window. The owner field and the parent field must be defined by the programmer.

The Miscellaneous Information column 26 contains any type of additional information which is necessary for the effective operation of the methodology. For example, the List Box control type contains a reference to table 2 shown in FIG. 3, described below. Once the list box control is defined and drawn in Window 56, then the actual data to be displayed in the list box will be read from FIG. 3 (i.e., data item 1, data item 2, data item 3 and data item 4) and displayed in the list box 57 which has an identifier of 533.

FIG. 3 illustrates table 2 which contains data for the List Box and the Radio Button. Table 2 within FIG. 3 merely holds data to be displayed in the respective control. For example, identifier 533 (list box 57) will show data item 1 through data item 4 from FIG. 3 on the screen illustrated in FIG. 5B. These rows will be read by programmers and coded based on the control identifier number. For example, identifier 531 (radio buttons 55) will show value 1 through value 4 from FIG. 3 after control identifier 531 or Radio Buttons have been defined in the code.

Figure 4A:
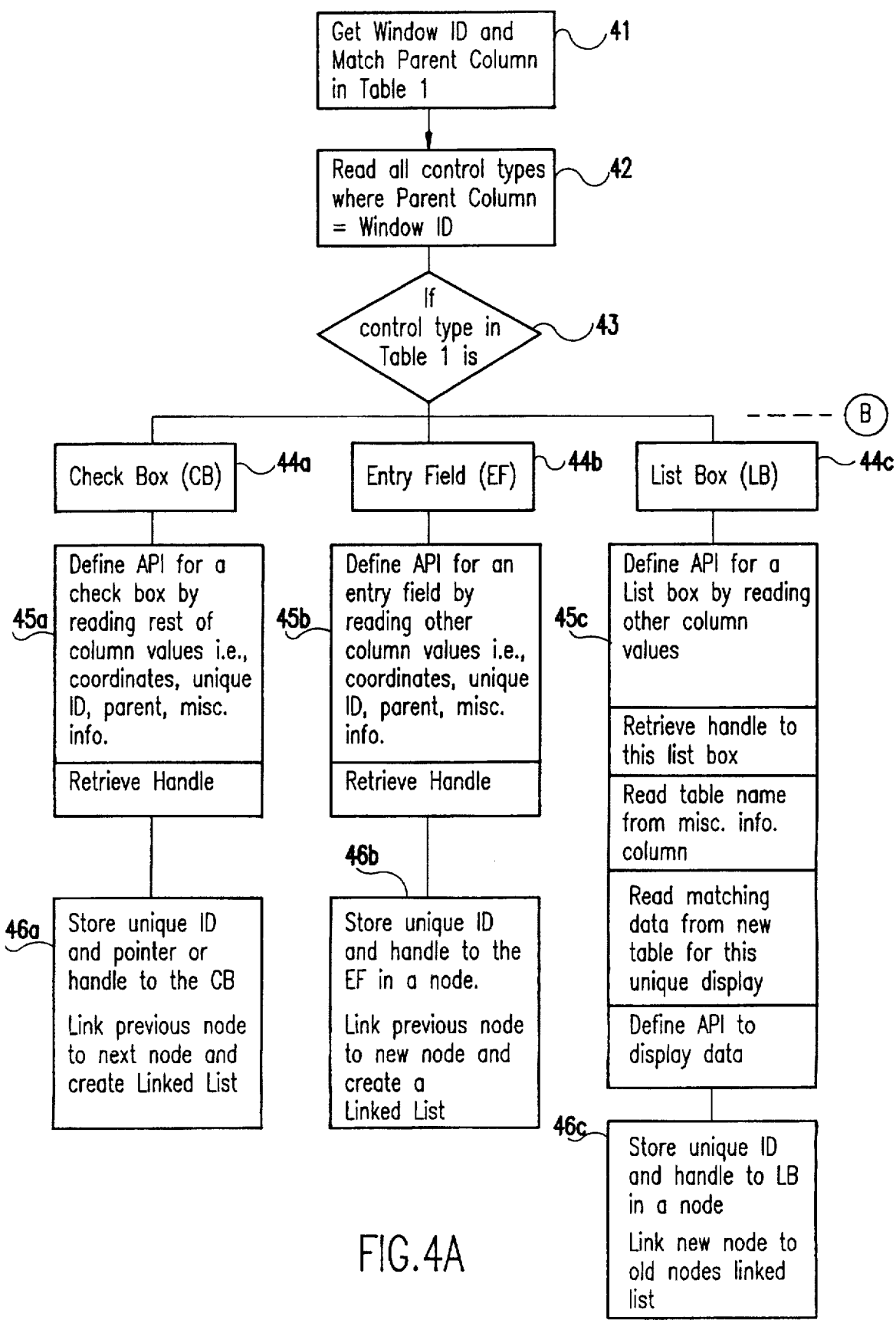
FIGS. 4A and 4B are block diagrams illustrating a flow chart of the preferred method of the present invention.
Figure 4B:
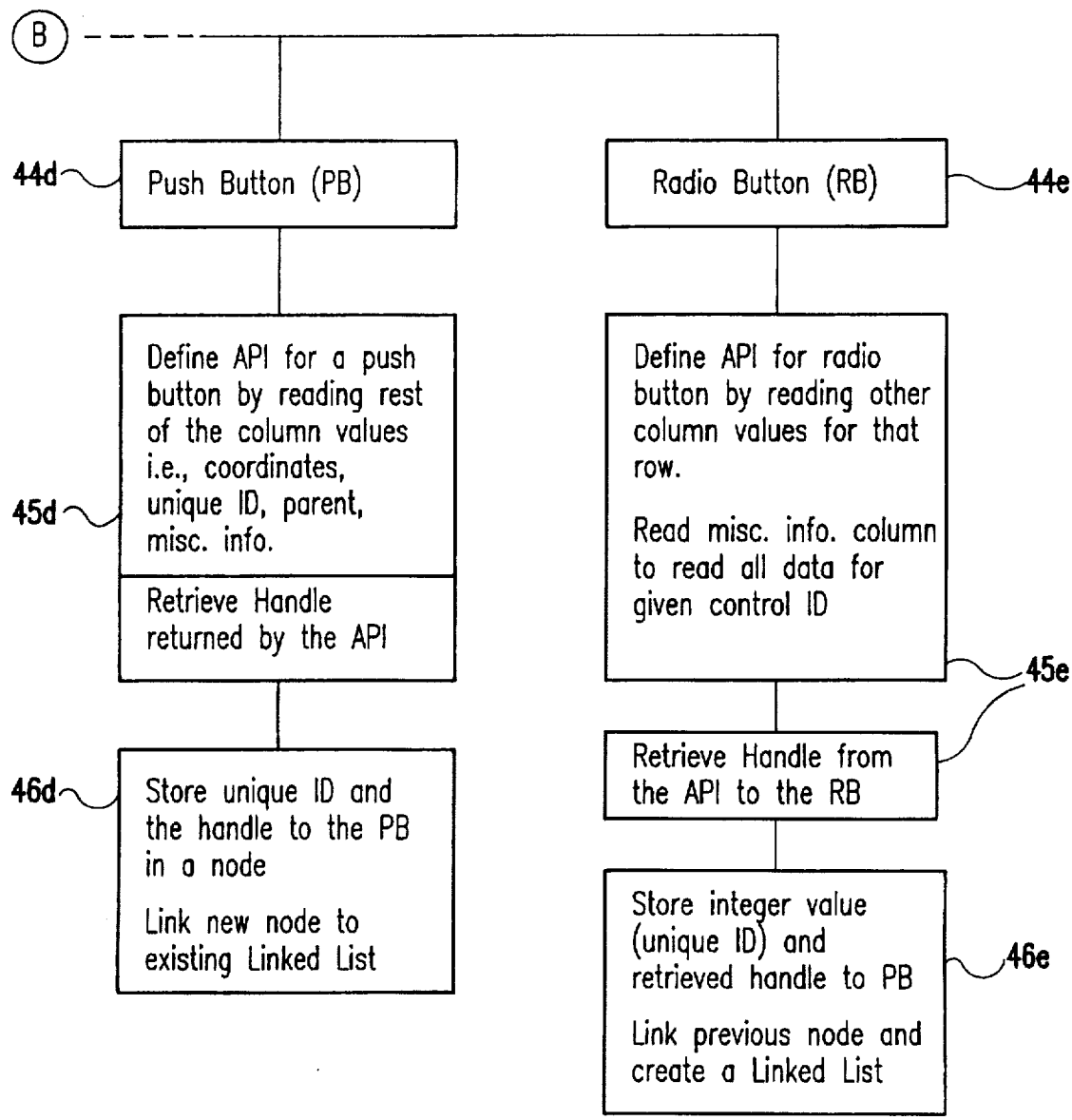

FIGS. 4A and 4B illustrate a flow chart of steps of each of the exemplary control types of the inventive method for managing, defining and drawing child windows or controls within a parent window.

Specifically, the first step 41 in the flow chart of FIG. 4 is to acquire the window ID and match the same to the parent column 24 in FIGS. 2A and 2B. The next step 42 is to read all the control types from column 21 in FIGS. 2A and 2B where the parent column 24 is equal to a given window identification. If the control type is in table 1 (FIGS. 2A and 2B), then the method proceeds (step 43).

Each control type is then processed according to the following generic steps. The control type is identified in step 44. Next, in step 45, the method defines the API for the specific control type by reading the rest of the values within the columns 22–26 in Table 1 (FIGS. 2A and 2B) and a handle is retrieved. Finally, the last step 46 stores a unique ID and a pointer or handle to the control type and links the previous node to the next node to create a Linked List.

Step 45c relating to the List Box includes the extra processing of reading the miscellaneous information column 26 and referring to table 2 (FIG. 3) to obtain the necessary display data Looking at the inventive methodology in more detail, the first step in the method is to read in the control types from a given database. Such a given database would be established by the designer/programmer. The database is simply a repository of rules of how and where different controls are to be displayed for a given window. This database/storage of rules defines how a window looks and what it contains. The programer will create APIs based on the given rules. The rules are the sets of directions for the application programs.

In the method according to the present invention, for each type of control (e.g., defined in the database of rules described above and as shown in Table 1 of FIGS. 2A and 2B), a generic case statement is defined by, for example "create push buttons" (coordinates, unique ID, Parent, Owner and Miscellaneous Information).

An example of a generic case statement is that the total program (real time) can be one big case statement and, based on the type of control defined in Table 1 (FIGS. 2A and 2B) which will execute the required code. An example of a case statement is illustrated below entitled "Pseudo Code for Case Statement."

Below is an exemplary Pseudo code for just creating controls in a given window using the IF - - - THEN - - - ELSE statement.

```
Psuedo Code

Read the window ID
Do for all controls in Table 1 for a given parent = window
    If control type = 'Push Button'
        Create Push Button (coordinates, unique ID, parent or
        window ID, owner or window ID, "Title of PB");
    Else if control type = 'Check Box'
        Create check box (coordinates, unique ID, parent or
        window ID, owner or window ID, "Title of CB");
    Else if control type = 'Radio Button'
        Create Radio Button (coordinates, unique ID, parent
        or window ID, owner or window ID);
        Read in column Misc. Info. for pointer to table that
        stores values
        Do until (no more values);
            Read values from table that stores values
            mapping control ID or unique ID for this RB;
            create Radio Button (Data);
        End;
    Else if control type = 'Entry Field'
        Create entry field (coordinates, unique ID, parent,
        owner, "title of EF" from Misc. Info column);
    Else if control type = 'List Box'
        Create List Box (coordinates, unique ID, parent,
        owner, read pointer to table that stores values in Misc.
        Info column;
        Do until (no more values);
            Read data column from given table for given
            control ID;
            create List Box values (DATA);
        End;
```

Below is the Pseudo code for creating controls for a given window to storing these values in a Linked List. This pseudo code uses a case statement.

```
Pseudo code for case statement

Read the window ID
Do for all controls in table 1 for the given parent = Window ID
    Case (control type)
        'Push Button':
            PB Handle = Create Push Button (coordinates,
            unique ID, parent ID, owner, "Title of PB");
            Store unique ID and PB Handle in a Node;
            Link this Node to existing Linked List of other
            Push Buttons;
        'Check Box':
            CB Handle = Create Check Box (coordinates,
            unique ID, parent ID, owner, "Title of Check
            Box);
            Store unique ID and CB Handle in a Node;
            Link this node to existing Linked List of other
            Check Boxes;
        'Radio Button':
            RB Handle = Create Radio Button
            (coordinates, unique ID, parent ID, owner,
            "Title of Radio Button");
            Store unique ID & RB Handle in a Node;
            Link this node to existing Linked List of other
            Radio Buttons;
        'Entry Field':
            EF Handle = Create Entry Field (coordinates,
            unique ID, parent ID, owner, "Title of Entry
            Field);
            Store unique ID & EF Handle in a Node;
            Link this node to existing Linked List of other
            Entry Fields;
        'List Box':
            LB Handle = Create List Box (coordinates,
            unique ID, parent ID, owner, "Title of List
            Box);
            Store unique ID & LB Handle in a Node;
            Link this node to existing Linked List of other
            List Boxes;
    End; [* of case statement *]
```

The generic case statement selects an API and executes a block of code that defines and creates a specific control type. For example, this block of code will invoke the specific API to define and draw the given child window. Some examples of the actual code required in Program Manager to define the respective controls are: I List Box (control ID, parent ID), I Radio Button (control ID, parent, owner, coordinates); I Push Button (control ID, parent, owner, coordinates), etc.

Next, for each control type, a handle or pointer is retrieved from the API relating to the specific control type (e.g., Check Box, Entry Field, List Box, Push Button or Radio Box). The handle or pointer may appear as "Handle to Check Box= Create Check Box". The return from this API is the actual pointer value of the respective window. The code will ultimately generate a linked list of all like pointers, as discussed in further detail below.

For example, for the Check Box a handle is retrieved from the API to the Check Box. The handle is the unique ID returned by the API to create any window. The handle allows the program to send commands to a particular window. Every opened window has a unique handle, defined by the graphical manager (e.g., PM for OS/2 defines a handle for every successfully defined window on the display screen).

Next, an identification code and the handle is associated with each control type. This association is made when the API called upon successfully executes and defines the window. The return of a handle value means the code communicated properly to the Program Manager the elements for drawing a window or a control.

For example, an integer value (ID) and pointer or handle is stored to the control type (e.g., Check Box, Entry Field, etc.). The integer value represents the identification code.

Next, a previous node is linked to the next node and a linked list of all like pointers is created. A single node will store values for a given control. For example, a node for a push button will contain:

1) A unique ID for a push button;
2) A Handle to the push button;
3) A pointer to the next Node; and
4) A pointer to the previous Node.

Figure 6:
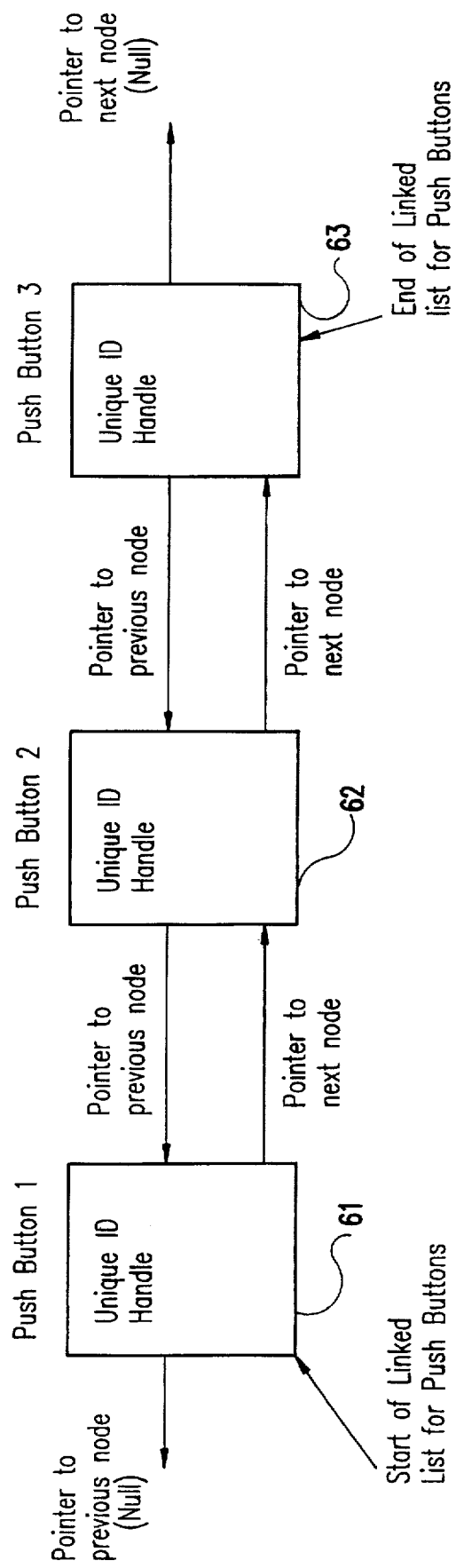
FIG. 6 is a block diagram which illustrates a Linked List according to the present invention.

FIG. 6 illustrates a Linked List for push buttons. The Linked List starts with push button 61 which has a pointer to the next node (push button 62). However, the pointer to the previous node has a null value. Therefore, in effect push button 61 only has a pointer to push button 62. Push button 62 has a pointer to the previous node, push button 61, and a pointer to the next node, push button 63. Push button 63 only has an effective pointer to the previous node, push button 62. The pointer to the next node in push button 63 has a null value. Therefore, push button 63 is the end of the Linked List.

The linked list of nodes may contain, for example, a plurality of fields to include a pointer to link to the next node within the given list, an integer value of unique ID of the newly defined control field, and a handle to the control window. The Linked List is a data structure to store Information for newly created control windows.

This allows the calling program to traverse the chains of predefined control types established in the linked list to retrieve individual handles of the requested child windows. The calling program will be coded to display the main window. The calling program will call the pseudo code, shown above, and the pseudo code will draw and define all required controls and return the same to the calling program. Similarly, other programs will call the pseudo code and the pseudo code will draw and define the required controls and return the same to the other calling programs.

The inventive method can be implemented on any higher level language. For example, it can be implemented on a PS2 with the OS2 operating system using an IBM CSET/2 compiler. However, while the method is optimized for the OS2, it is advantageously used with any window-based system such as AIX and NT.

The inventive method allows user interfaces to be altered at any time throughout the life of the AP without requiring changes to the hard code of the AP. By not altering the hard code of AP, the compilation time of changes is reduced since only rules defined in the database (be it relational or flat files) need be changed. Therefore, the programmer can run the executable file to read the rule tables and see the results of new rules on-line (e.g. in real-time on the screen), and the chance of introducing "bugs" into the program is substantially reduced. Once the main code is developed, compiled and linked into a executable file, it does not need to be changed. Adding a new window is as simple as adding a new rule (one row) into the rule table.

Further, according to this method, the same code can be used to arrange the layout of controls in other parent window, thereby saving substantially on software development and maintenance costs. Therefore, the method is useful for a variety of applications, such as an on-line tool implementation.

Main windows for an application can also be designed by using the same methodology given above. The rule table will be different and so will the code as will be well understood by the ordinarily skilled artisan.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A computer-implemented method for a system having a plurality of application software interfaces, said method comprising steps of:

preparing a customized database including coordinates and control types of customized window setups for said application software interfaces, said customized database comprising a table including one of a control type column, a coordinates column, an identification code column, a parent window column, an owner window column and a miscellaneous information column;

reading a control type from said control types stored in said database;

selecting an application software interface having a pointer based on said control type;

defining an identification code for said control type;

storing said pointer and said identification code in said database;

forming a customized window layout based on said database; and linking a first node to a second, subsequent node of control types and creating a linked list of said plurality of control types.

2. A method as in claim 1, further comprising a step of defining an application software interface (ASI) for each respective one of said at least one control type and retrieving a pointer from each ASI to its respective control type.

3. A method as in claim 1, wherein said customized window layout is alterable without altering an application software code.

4. A method as in claim 1, wherein said database executes said application code and said application program is devoid of any hard coding of controls.

5. A method as in claim 1, wherein said preparing step customizes said window layouts for each of said application software interfaces.

6. A computer-implemented method for developing customized application window setups, said method for a system having a plurality of application program interfaces, said method comprising steps of:

preparing a customized database including coordinates and control types of said customized application window setups, said customized database comprising a table including one of a control type column, a coordinates column, an identification code column, a parent window column, an owner window column and a miscellaneous information column;

reading in at least one control type from said control types stored in said database;

defining an application program interface (API) for each respective one of said at least one control type and retrieving a pointer from each API to its respective control type;

storing a value and pointer for said control type in said database forming a customized window layout based on said database; and linking a first node to a second, subsequent node of said plurality of control types and creating a linked list of said plurality of control types, wherein a same application code is reusable for at least two customized window layouts of said application window setup.

7. A method as in claim 6, wherein said customized window layout is alterable without altering an application software code.

8. A method as in claim 6, wherein said database executes said application code and said application program is devoid of any hard coding of controls.

9. A method as in claim 6, wherein said preparing step customizes said window layouts for each of said application software interfaces.

10. A computer-implemented method for developing customized application window setups, said method for a system having a plurality of application software interfaces for an application program, said method comprising steps of:

preparing a customized table including coordinates and control types of said application customized window setups for said application software interfaces, said table further including one of a control type column, a coordinates column, an identification code column, a parent window column, an owner window column and a miscellaneous information column;

reading a control type from said control types stored in said database;

selecting an application software interface having a pointer based on said control type;

defining an identification code for said control type;

storing said pointer and said identification code in said database, wherein said database is separate from said application program;

forming a customized window layout based on said database; and linking a first node to a second, subsequent node of control types and creating a linked list of said plurality of control types, wherein said customized window layout is alterable without altering an application software code, and wherein said database executes said application code and said application program is devoid of any hard coding of controls.

11. A method as in claim 10, wherein said preparing step customizes said window layouts for each of said application software interfaces.

12. An apparatus for developing customized application window setups based on predefined rules, said apparatus comprising:

a database for storing said predefined rules, said predefined rules including coordinates and control types of said customized application window setups, said database comprising a table including one of a control type column, a coordinates column, an identification code column, a parent window column, an owner window column and a miscellaneous information column;

a plurality of application software interfaces for an application program;

means for reading a control type from said control types stored in said database;

means for selecting an application software interface having a pointer based on said control type;

means for defining an identification code for said control type;

means for storing said pointer and said identification code in said database, wherein said database is separate from said application program;

means for forming a customized window layout based on said database; and means for linking a first node to a second, subsequent node of control types and creating a linked list of said plurality of control types.

13. A method as in claim 12, wherein said customized window layout is alterable without altering an application software code.

14. An apparatus as in claim 12, wherein said database executes said application code and said application program is devoid of any hard coding of controls.

15. An apparatus as in claim 12, wherein preparing means customizes said window layouts for each of said application software interfaces.

* * * * *